(12) United States Patent
Briskin et al.

(10) Patent No.: US 12,147,482 B1
(45) Date of Patent: Nov. 19, 2024

(54) MODIFYING QUERY IN DISCOURSE CONTEXT

(71) Applicant: GOOGLE LLC, Mountain View, CA (US)

(72) Inventors: Gil Simha Briskin, Petach Tikva (IL); Ajay Joshi, Mountain View, CA (US); John Eric Hoffmann, Los Angeles, CA (US)

(73) Assignee: GOOGLE LLC, Mountain View, CA (US)

(*) Notice: Subject to any disclaimer, the term of this patent is extended or adjusted under 35 U.S.C. 154(b) by 10 days.

(21) Appl. No.: 17/504,173

(22) Filed: Oct. 18, 2021

Related U.S. Application Data

(63) Continuation of application No. 15/015,362, filed on Feb. 4, 2016, now Pat. No. 11,151,129, which is a continuation of application No. 13/950,956, filed on Jul. 25, 2013, now Pat. No. 9,286,395.

(51) Int. Cl.
  *G06F 16/951* (2019.01)
  *G06F 16/242* (2019.01)

(52) U.S. Cl.
  CPC ........ *G06F 16/951* (2019.01); *G06F 16/2425* (2019.01)

(58) Field of Classification Search
  CPC .. G06F 16/951; G06F 16/2425; G06F 16/953; G06F 16/9532; G06F 16/9538
  See application file for complete search history.

(56) References Cited

U.S. PATENT DOCUMENTS

| | | |
|---|---|---|
| 7,197,479 B1 | 3/2007 | Franciscus de Heer et al. |
| 8,868,590 B1 * | 10/2014 | Donneau-Golencer ..................... G06F 16/24578 707/765 |
| 2007/0276811 A1 | 11/2007 | Rosen |
| 2010/0036829 A1 | 2/2010 | Leyba |
| 2012/0117049 A1 | 5/2012 | Zhou |
| 2012/0130969 A1 * | 5/2012 | Wong .................. G06F 16/9535 707/706 |
| 2013/0024474 A1 | 1/2013 | Kraft et al. |
| 2013/0238588 A1 * | 9/2013 | Annau .................... G06F 16/95 707/708 |
| 2014/0344263 A1 * | 11/2014 | Dhamdhere ........ G06F 16/3338 707/E17.084 |

* cited by examiner

*Primary Examiner* — Allen S Lin
(74) *Attorney, Agent, or Firm* — Gray Ice Higdon

(57) ABSTRACT

Methods, systems, and apparatus, including computer programs encoded on a computer storage medium, for modifying queries in a discourse context. In one aspect, a method includes determining whether a query received from a user device subsequent to information provided to a user device and that defines a discourse context belongs to the discourse context. If the query belongs to the discourse context, the query is modified to take into account attributes of the discourse context.

16 Claims, 6 Drawing Sheets

MODIFYING QUERY IN DISCOURSE CONTEXT

BACKGROUND

This specification relates to query processing.

The Internet provides access to a wide variety of resources, such as image files, audio files, video files, and web pages. A search system can identify resources in response to queries submitted by users and provide information about the resources in a manner that is useful to the users.

Search systems are becoming increasingly sophisticated to facilitate new user interaction models. For example, speech recognition and speech processing systems are prevalent in many consumer electronic devices. Many of these electronic devices now utilize speech command processing techniques to invoke and perform search operations. For example, a user device, such as a smart phone, can process speech commands to submit a query to a search engine.

User spoken queries are often different from the queries a user would type into a search box when using a typing input. This is because users tend to fall into a "conversational" behavior when speaking queries, and the queries are less structured and include more "filler" words than similar queries when typed. For example, when a user wants information regarding the local weather, the user may utter "What's my weather like today?" However, when typing in such a query, the user may type "local weather."

SUMMARY

In general, one innovative aspect of the subject matter described in this specification can be embodied in methods that include the actions of determining, for each of a plurality of user devices, a first information and subsequent query pair, wherein for each pair the first information is provided to the user device for user consumption and the subsequent query received from the user device subsequent to the first information being received at the user device; for each pair of first information and subsequent query: determining whether the first information includes one or more attributes indicative of a discourse context, and determining whether the subsequent query belongs to the discourse context; for each subsequent query of a pair for which the first information is determined to be indicative of the discourse context and for which the subsequent query is determined to belong to the discourse context: generating a discourse query that is based on terms of the subsequent query and attribute values of the attributes indicative of the discourse context, and providing the discourse query to a search engine so the search engine provides, to the user device that provided subsequent query, search results responsive to the discourse query in response to the subsequent query; and for each subsequent query of a pair for which either the first information is not determined to be indicative of the discourse context or the subsequent query is determined not to belong to the discourse context, providing the subsequent query to a search engine so the search engine provides, to the user device that provided the subsequent query, search results responsive to the subsequent query. Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. The use of a discourse context enables users to provide follow-up queries in a natural, conversational manner, which facilitates ease of use of user devices. Furthermore, when attributes are predefined as being indicative of a conversational context, design of the system is simplified in that extensive machine learning is not needed. This reduces system development time and costs. In implementations in which semantic meaning is derived from the subsequent query, the semantic meaning need not take into account the semantic meanings of previous queries. This allows for a more robust analysis of semantic meaning, as the analysis is not constrained by prior queries. Finally, the discourse context can be derived, in part, from information provided by a search engine for user consumption, and thus is not dependent on prior queries submitted by users.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
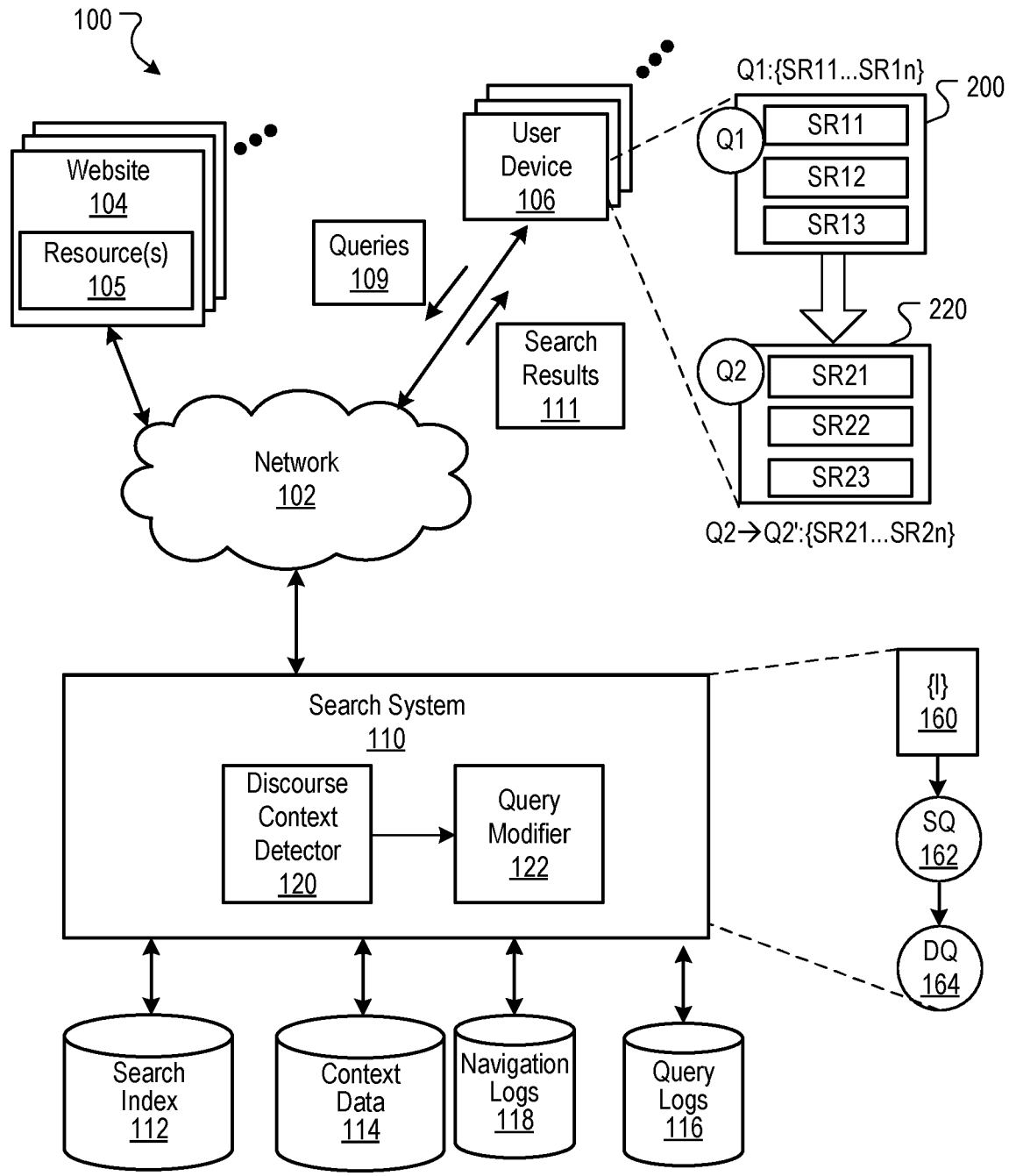
FIG. 1 is a block diagram of an example environment in which a search system provides discourse queries when a discourse context is detected.

FIG. 1 is a block diagram of an example environment 100 in which a search system 110 provides search services. The example environment 100 includes a network 102, e.g., a local area network (LAN), wide area network (WAN), the Internet, or a combination of them, connects websites 104, user devices 106, and the search system 110. The network 102 can be accessed over a wired and/or a wireless communications link. For example, mobile computing devices, such as smartphones, can utilize a cellular network to access the network.

A website 104 is one or more resources 105 associated with a domain name and hosted by one or more servers. An example website is a collection of web pages formatted in hypertext markup language (HTML) that can contain text, images, multimedia content, and programming elements, e.g., scripts. Each website 104 is maintained by a publisher, e.g., an entity that manages and/or owns the website.

A resource 105 is data provided over the network 102 and that is associated with a resource address. Resources 105 that can be provided by a website 104 include HTML pages, word processing documents, and portable document format (PDF) documents, images, video, and feed sources, to name just a few. The resources 105 can include content, e.g., words, phrases, images and sounds and may include embedded information, e.g., meta information and hyperlinks, and/or embedded instructions, e.g., scripts.

A user device 106 is an electronic device that is capable of requesting and receiving resources 105 over the network 102. Example user devices 106 include personal computers, mobile computing devices, e.g., smartphones and/or tablet computing devices, that can send and receive data over the network 102. A user device 106 typically includes a user application, e.g., a web browser, to facilitate the sending and receiving of data over the network 102.

To facilitate searching of resources 105, the search system 110 identifies the resources 105 by crawling and indexing the resources 105 provided on websites 104. Data about the resources 105 can be indexed based on the resource to which the data corresponds. The indexed and, optionally, cached copies of the resources 105 are stored in a search index 112.

The user devices 106 submit search queries 109 to the search system 110. In response, the search system 110 accesses the search index 112 to identify resources 105 that are relevant to, e.g., have at least a minimum specified relevance score for, the search query 109. The search system 110 identifies the resources 105, generates search results 111 that identify the resources 105 or other relevant information, and returns the search results 111 to the user devices 106.

When a search result 111 identifies a resource, the search result includes an address link of the resource 105 that is responsive to a particular search query. An example of such a search result 111 can include a web page title, a snippet of text or a portion of an image extracted from the web page, and the URL of the web page.

The search system 110 can also generate search results that have other information, such as a "search one box" and provide the answer box in response to a search query 109. In general, an answer box is a formatted presentation of content that is relevant to a query 109. The content of the answer box can be content that has been generated by the search system 110, or provided by third parties to the search system 110 for inclusion in an answer box. An answer box can include text, images, video, audio, forms, documents, and other types of data that can exist in a computing environment. The answer box may be provided with other search results in response to queries. For example, a query for "weather in Atlanta" may result in an answer box with a weather forecast for the city of Atlanta.

An answer box can be formatted based on a category for the answer box, and each search one box may have a variety of attributes. Example categories for search one boxes include weather, financial security information, audio, video, people, places, landmarks, animals, and show times, e.g., movie listings, to name a few. Each search one box can be created according to the template. The templates define the type of content in the answer box and the formatting of the content. For example, a template for a weather information search one box may include a predefined area for presenting an image indicative of the current weather in a particular location and a predefined area for text that specifies the weather for the current time and weather forecasts for future time periods. When generating an answer box, the search system 110 can select a template, identify content for populating the template, and provide the template and identified content to the user device 106 for presentation.

An answer box can include content obtained from one or more websites 104 or resources 105. For example, an answer box may include weather information obtained from a website of a weather forecaster or from websites of multiple weather forecasters. The search system 110 can identify content from the one or more websites and specify the content for populating an answer box.

Search one boxes may also include web links to other websites. For example, the search system 110 may provide a link to each website from which content presented by the answer box was obtained. This enables users to easily navigate to those websites to obtain additional information by interacting with the links.

Search one boxes can be presented along with search results 111, or independent of search results 111. In some implementations, one or more search one boxes are presented at the top of a search results page and above other search results 111 identified as being responsive to a search query 109. In some implementations, a search results page may include one or more search one boxes only, without having other search results 111. For example, a single search one box may be sized in a manner to fill a search results page or display of a user device 106 if the search system 110 determines with at least a threshold level of confidence that the answer box provides the content for which the user is looking.

The search system 110 can identify initial content and additional content for an answer box based, at least in part, on a received query 109. For example, the search system 110 may identify a wide variety of content that is relevant to a query 109. The search system 110 can select, from the identified content, initial content that is to be presented in the answer box when the search results page is initially presented.

The category for a query 109 can be determined, for example, based on a query-category mapping that specifies one or more categories to which each query in a set of queries has been categorized. For example, the query category mapping may specify that a query that includes the phrase "current temperature" maps to the category of weather queries. Similarly, the query mapping may specify that a query that matches a stock symbol for a stock that is traded on a stock exchange maps to the category of finance queries. A query-category mapping can be created, for example, using query similarity measures, e.g., cosine similarity measures, clustering techniques that create clusters of queries on a per-category basis, or other query categorization techniques, for example, hierarchical term mappings that specify hierarchical relationships between phrases.

In some implementations, the queries submitted from user devices 106 are stored in query logs 116. Selection data for the queries and the web pages referenced by the search results and selected by users are stored in navigation logs 118. The query logs 116 and the navigation logs 118 define search history data that include data from and related to previous search requests associated with unique identifiers. The navigation logs 118 represent actions taken responsive to search results provided by the search engine 110. The query logs 116 and navigation logs 118 can be used to map queries submitted by user devices to resources that were identified in search results and the actions taken by users when presented with the search results in response to the queries. In some implementations, data are associated with the identifiers from the search requests so that a search history for each identifier can be accessed. The navigation logs 118 and query logs 116 can thus be used by the search system 110 to determine the respective sequences of queries submitted by the user devices, the actions taken in response to the queries, the times of those actions, and how often the queries have been submitted.

The search system 110 can also provide information to user devices without requiring a query. For example, the search system 110 can be configured to provide notifications to the user regarding information that may be of interest to the user. For example, the search system 110 may be configured to recognize repeated actions that a user performs on a user device and provide information for display on the user device. For based on user queries, the search system 110 may determine that a user has an interest in a particular baseball team. Suppose the user is then near a stadium in which the baseball team is scheduled to play a game in the next several hours. The search system 110 can send information to the user device of the user to notify the user that the baseball team will play a game in the next several hours, and that includes a link to a website through which the user may purchase tickets to the game.

Thus, the search system 110 can provide information for user consumption in a variety of different formats—search results, notifications, instant messages, and the like.

As described above, many user devices 106 facilitate spoken query inputs. Users tend to maintain a conversation, or "discourse" context when speaking queries. The discourse context takes into account information the user has received prior is issuing a query. For example, suppose the user receives the notification that the baseball team will play a game in the next several hours. The user may want to know whether it will rain during the game, and may thus speak the query "Will I need an umbrella?"

Figure 2A:
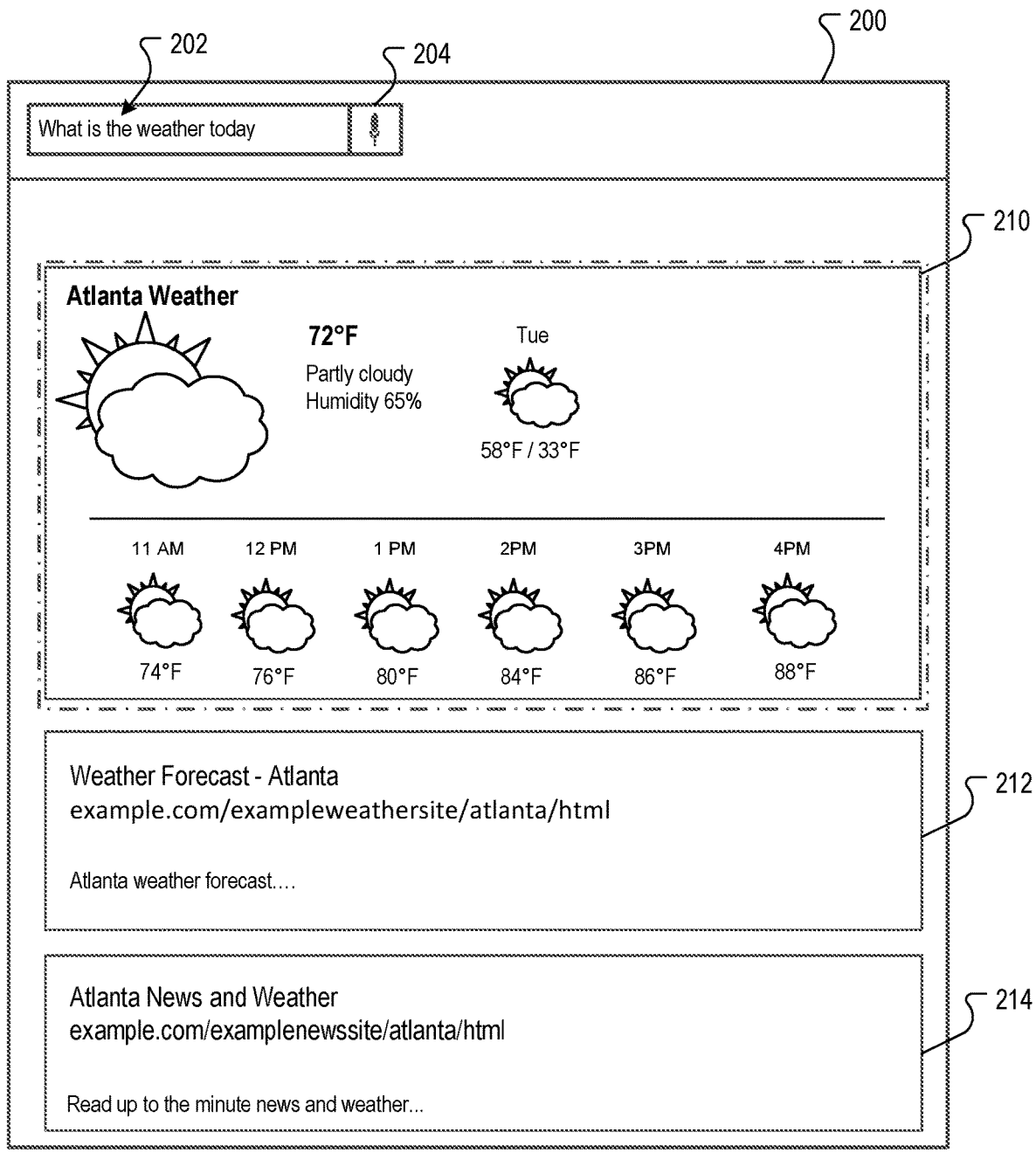
FIG. 2A, FIG. 2B, and FIG. 2C are screen shots of an example search interface in which queries and search results are provided.

Likewise, the discourse context may occur over multiple queries when using speech-to-text query inputs. For example, suppose a user in Atlanta, Georgia, speaks the query "What is the weather today?" The search system 110 receives the query and location information, and provides, for example, a weather forecast search one box, and other search results. This interaction and the search results are represented by the search results page 200 shown in FIG. 1, and shown in more detail in FIG. 2A, which is a screenshot of an example search interface 200 in which an answer box 210 and other search results 212 and 214 are presented. The search interface 200 can be presented at a user device, such as a mobile phone or tablet computing device. The search interface 200 includes a query entry input display 204 that display a speech-to-text output of an uttered query 202 "What is the weather today." The search interface 200 also includes a mode indicator 204 indicated the input is in a speech-to-text mode.

The search interface 200 also includes an answer box 210 search result and web search results 212 and 214. The answer box 210 search result and the web search results 212 and 214 are search results that have been received from a search system 110 in response to the submission of the search query 202. Although one search one box 210 and two search results 212 and 214 are illustrated in the example search interface 200, other numbers of search one boxes and search results may be presented by a search interface 200.

After reviewing the search interface, the user speaks the query "How about in New York City?" If the search system 110 does not have the ability to determine the discourse context of the query "How about in New York City", the query is processed without taking into account information from the prior query "What is the weather today?" Accordingly, the search system 110 may not provide weather information for New York City.

The account for the discourse context, the search system 110 includes a discourse context detector 120 and a query modifier 122. As will be described in more detail below, the discourse context detector 120 determines if a discourse context is applicable to a second query, and, if so, will cause a query modifier 122 to modify the second query to take into account the discourse context.

A discourse context is a context that applies to a pair of first information 160 and subsequent query 162. The first information is provided to the user device 106 for user consumption and the subsequent query 162 is received from the user device 106 subsequent to the first information 150 being received at the user device 106. The first information 160 may be a search result, a text message, a notification, or other information provided by the search system 110 to the user device for consumption by the user. The content of the first information is selected to satisfy a user's informational need as determined by the search system 110. If the discourse context applies, then the subsequent query 162 is modified, based on the attributes of the first information 160, to form a discourse query 164.

For example, in the context of a search result and a subsequent query, a discourse context is indicative of a particular subject or semantic meaning of the search results for a first query applying to a second query that is a subsequent query to the first query. Determination of whether a discourse context is applicable to a second query is described with reference to FIG. 3 below.

Figure 2B:
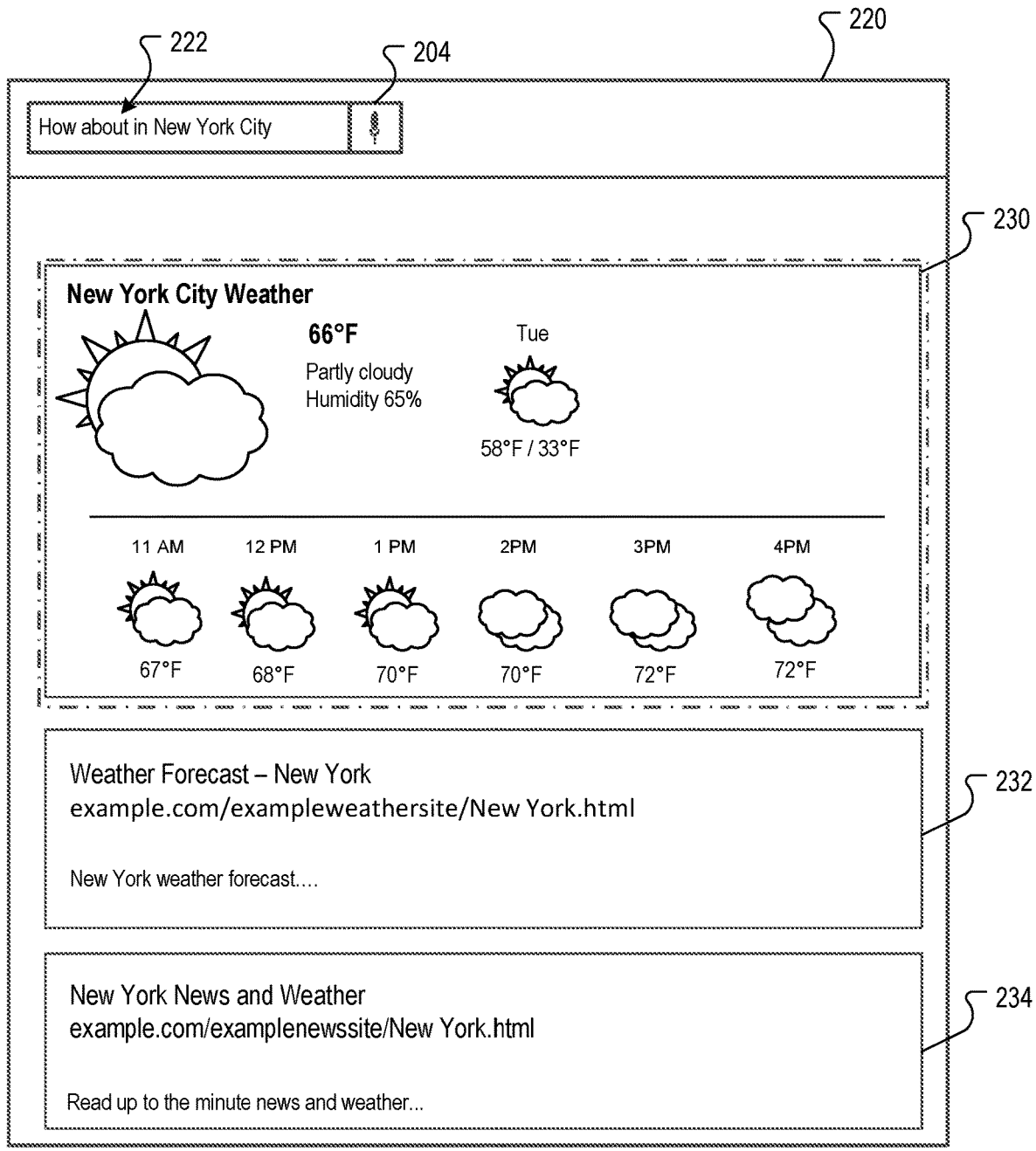

For the second query "How about in New York City?", the discourse context detector 120 determines the discourse context applies to the second query. In response, the discourse context detector causes the query modifier 122 to modify the second query to take into accounts attributes derived from one or more search results for the first query. The query modifier 122 generates a discourse query that is based on the second query and attribute values of the one or more search results for the first query. This modified query Q2' and the search results are represented by the search results page 220 shown in FIG. 1, and shown in more detail in FIG. 2B, which is a screenshot of an example search interface 220 in which an answer box 230 and other search results 232 and 234 are presented.

The search interface 220 is similar to the search interface 200, except that the query 222 "How about in New York City" and results 230, 232 and 234 are shown. Search result 230 is an answer box for weather for the location of New York City and the current time. The query 222, however, does not include a weather term. Had the query 222 been processed without taking into account the discourse context, weather related search results would not have been provided, or would have been ranked lower due to lower relevance scores. However, because the query was modified by the query modifier 122, weather related search results are included and highly ranked.

The query 222 does not depict the modification. Typically a modified query is not shown to a user, as the query modifier 122 may rewrite the query in a manner that is optimized for a search operation.

Figure 2C:
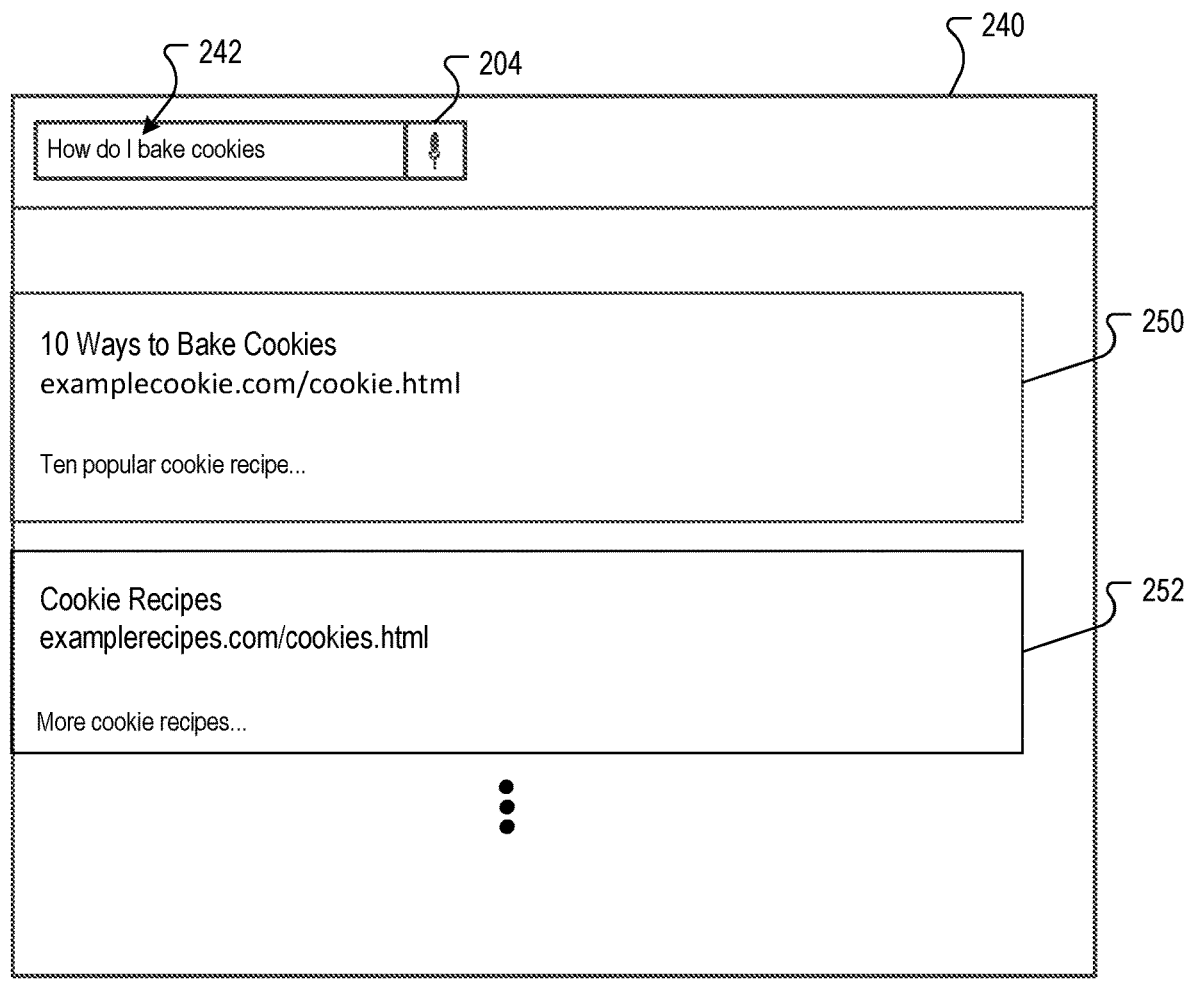

In operation, the discourse content detector 120 takes into account both the second query and the search results provided for the first query to determine whether a discourse context should be applied. Thus, for other queries that could have followed the first query "What is the weather today," the discourse content detector 120 may determine that a discourse context does not apply. For example, in FIG. 2C, the query "How do I bake cookies" has been input, and search results 250 and 252 are shown. Assume that the query 242 immediately followed the query 202, i.e., there were no intervening queries between the query "What is the weather today" and "How do I bake cookies." As will be described with reference to FIG. 3 below, the query "How do I bake cookies" is not determined to belong to the discourse context. Accordingly, the query modifier 122 does not modify the query to take into account the attributes of one or more search results for the first query. The query modifier 122, however, may still modify the second query in accordance with other search system 110 processes, such as query optimization techniques, query expansion techniques, etc.

In some implementations, the search system 110 determines query pairs of first and second queries from search logs, and, using the query pairs, determines a pair of first information in the form of a search result responsive to a first query, and a second query that is subsequent to the first query. The first information and subsequent query pair is then processed to determine whether a discourse context applies to the second query.

Figure 3:
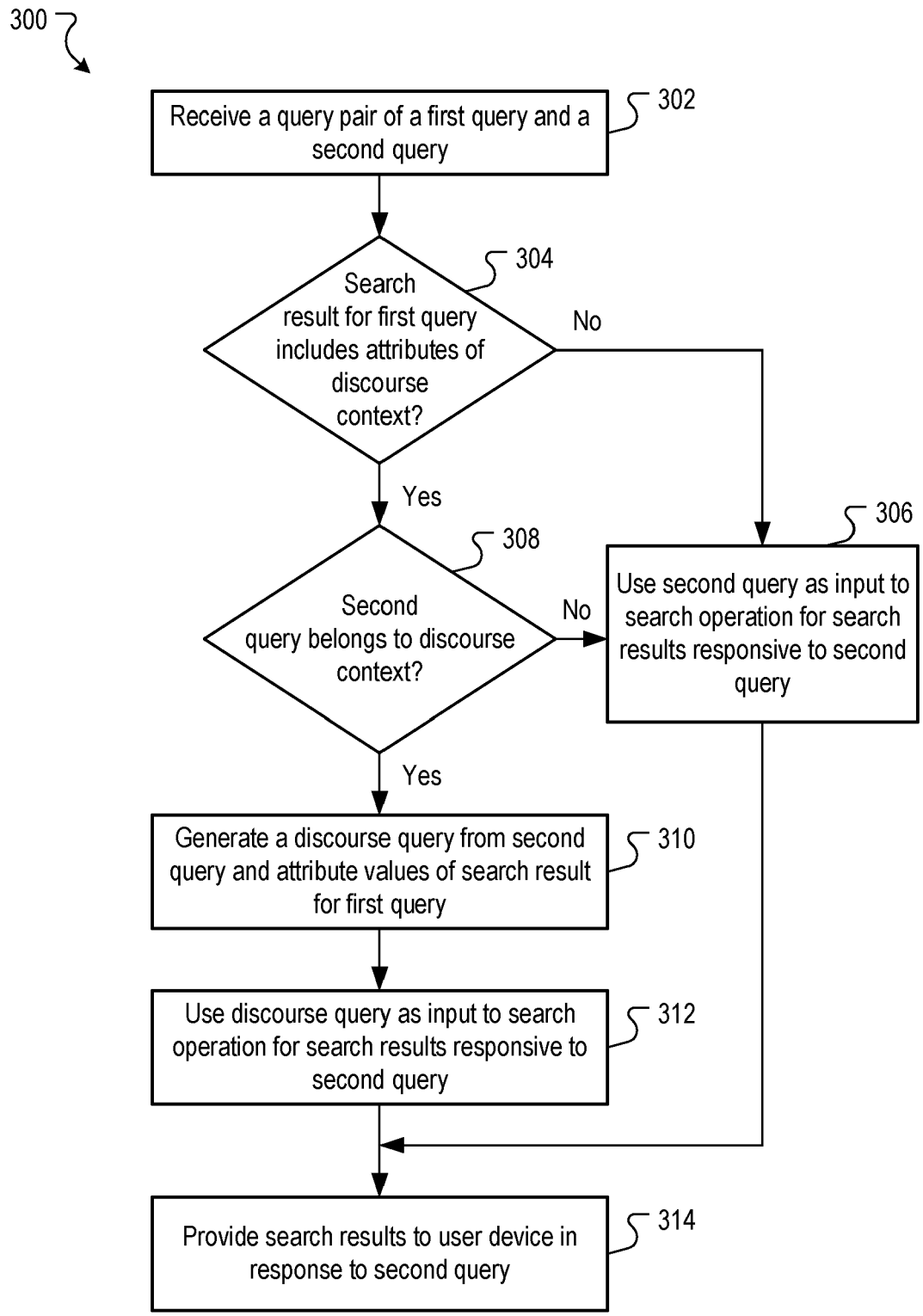
FIG. 3 is a flow chart of an example process for detecting a discourse context for a second query of a query pair and modifying a query when the discourse context is detected.

FIG. 3 is a flow chart of an example process 300 for detecting a discourse context for a second query of a query pair and modifying the second query when the discourse context is detected. The process 300 is implemented in one or more computers that are programmed to perform the operations of the web category discourse context detector 120, and is performed for each website for which a duration performance score is to be determined.

The process 300 receives a query pair of a first query and a second query (302). Each query pair of a first and second query are provided during a session from a user device. The second query is provided from the user device subsequent to a first query provided from the user device. In some implementations, there are no intervening queries in a query pair. However, in other implementations, a query pair can have a maximum number of intervening queries. For example, if the maximum number is 1, then for the following sequence of queries:

Q1→Q2→Q3, the following query pairs are identified: {Q1, Q2}, {Q2, Q3}, and {Q1, Q3}.

The process 300 determines if a search result for first query includes attributes of discourse context (304). As described above, a discourse context is a context that applies to a second query received after a first query for a search session, and is indicative of a particular subject or semantic meaning of the search results for the first query applying to second query. In some implementations, attribute sets are predefined as being indicative of a discourse context, and any search result (or underlying document) that includes attribute values of one of these sets of attributes will result in the discourse context detector 120 determining a search result for the first search query includes the attributes that are indicative of a discourse context. Examples of such attribute sets that are predefined as being indicative of a discourse context include one of a time attribute, a location attribute, a pair of time and location attributes, a pair of time and weather attributes, and a pair of weather and location attributes. The predefined definitions can be stored, for example, in context data 114 accessible by the discourse context detector.

A variety of appropriate processes can be used to determine if one or more of the search results provided in response to the first query include attributes indicative of a discourse context. For example, in some implementations, each search result in a top ranked subset of search results is processed to determine if one of the search results includes attributes of a discourse context. For example, the first ten search results may be processed. In other implementations, only certain types of search results are searched to determine a search result for first query includes attributes of discourse context. For example, only the top ranked search result may be processed.

Alternatively, only a search result that is of an answer box type may be processed to a search for determining whether attributes of discourse context are included. In variations of this implementation, if an answer box is provided, then the answer box is processed to determine whether it includes an attribute set that are predefined as being indicative of a discourse context. In alternate implementations, certain types of search one boxes form a proper subset of search one boxes that are predefined as being indicative of a discourse context. Thus, if the answer box is of a type included in the proper subset, then it is indicative of a discourse context. Examples of such one box types are weather one boxes with a location and time; finance one boxes with a focus intent (e.g., quote, market cap, etc.) and stock symbol; event one boxes that specify an event, location and time; and so on.

If the process 300 determines a search result for first query does not include attributes of discourse context, then the process 300 uses the second query as input to search operation for search results responsive to second query (306). For example, assume that for a first query none of the search results had an attribute set indicative of a discourse context. The discourse context detector 120 therefore determines that a discourse context will not apply to the second query, and the second query is used for the search operation. The second query may be modified by the query modifier 122, but the query modifier 122 will not modify it to take into account attributes of a discourse context.

If, however, the process 300 determines at 304 that a search result for first query does include attributes of discourse context, then the process 300 determines if a second query belongs to the discourse context (308). A variety of appropriate processes can be used to determine the second query belongs to the discourse context. For example, in some implementations, the discourse context detector 122 determines whether the second query includes terms that are pre-associated with the attributes of the first query that are indicative of a discourse context. To illustrate, assume that for a discourse context of an event (e.g., an event one box), the following terms are pre-associated with the discourse context: weather, rain, umbrella, coat; likewise, for the discourse context of finance (e.g., a finance one box), the following finance-related terms are pre-associated with the discourse context: stock tickers, quote, market cap, etc.

Now, assume a first query is "Give the schedule for the next Giants game" and an event one-box that provides the time and location of the next Giants game is provided. This one box defines an event discourse context that includes a time and location attribute. The search system 110 then receives the query "What will the weather be like?" for the same session. Because the term "weather" is pre-associated with the event one box, the query "What will the weather be like?" is determined to belong to the discourse context.

Now assume, however, the next query had been "What is the current Google stock price." Because none of these terms are associated with the event discourse context, the second query "What is the current Google stock price" is not determined to belong to the discourse context.

Continuing with this example, assume that after the query "What is the current Google stock price," a third query "What's its market cap?" is then received, and that the query "What is the current Google stock price," resulted in a finance one box search result. The finance one box defines a finance discourse context that includes a stock ticker attribute. The search system 110 then receives the query "What's its market cap?" for the same session. Because the term "market cap" is pre-associated with the finance event one box, the query "What's it's market cap?" is determined to belong to the discourse context.

Other ways of determining whether a second query belongs to a discourse context can also be used. For example, the discourse context detector 120 can include a natural language processor that determines a semantic meaning of the second query. The discourse context detector 120 then determines whether the semantic meaning is contextually related to the attributes of the first query that are indicative of a discourse context. For example, if the semantic yield of a second query is "weather forecast." then it would be related to any discourse context based on time and location attributes; however, it would not be related to a discourse context based on finance attributes.

If the process 300 determines a second query does not belong to a discourse context, then the process 300 uses the second query as input to search operation for search results responsive to second query (306). However, if the process 300 determines the second query does belong to a discourse context, then the process 300 generates a discourse query from the second query and attributes values of search result for first query (310), and uses the discourse query as input to search operation for search results responsive to the second query (312).

For example, for the query "What's its market cap?", the discourse query is generated from the terms "What's its market cap" and that attribute value "GOOG." A resulting discourse query may thus be "Market Cap Goog." Likewise, for the query "What will the weather be like." if the next Giants game is three days hence and in San Francisco, the resulting discourse query may be "Weather San Francisco Sunday" or "Weather Forecast San Francisco."

The process 300 provides search results to user device in response to second query (314). If the second query was used as input, then search result responsive to the second query are provided. If, however, the discourse query was used as input, then search result responsive to the discourse query are provided in response to the second query.

The process 300 is but one example process for detecting a discourse context for a second query of a query pair and modifying a query when the discourse context is detected, and other appropriate processes can also be used. For example, any search result of a particular structure type can be used to define a discourse context. Thus, in addition to search one boxes, other types of search results, such as a map result, a video result, etc. can also be used to define a discourse context. For example, if a query "Godzilla trailer" results in a video search result for the movie "Godzilla," a movie discourse context with the movie title attribute is generated. Then, if the next query is "How did it do at the box office", and the query term "box office" is associated with a movie discourse context, the query may be modified to surface search results for box office figures for the movie Godzilla.

Figure 4:
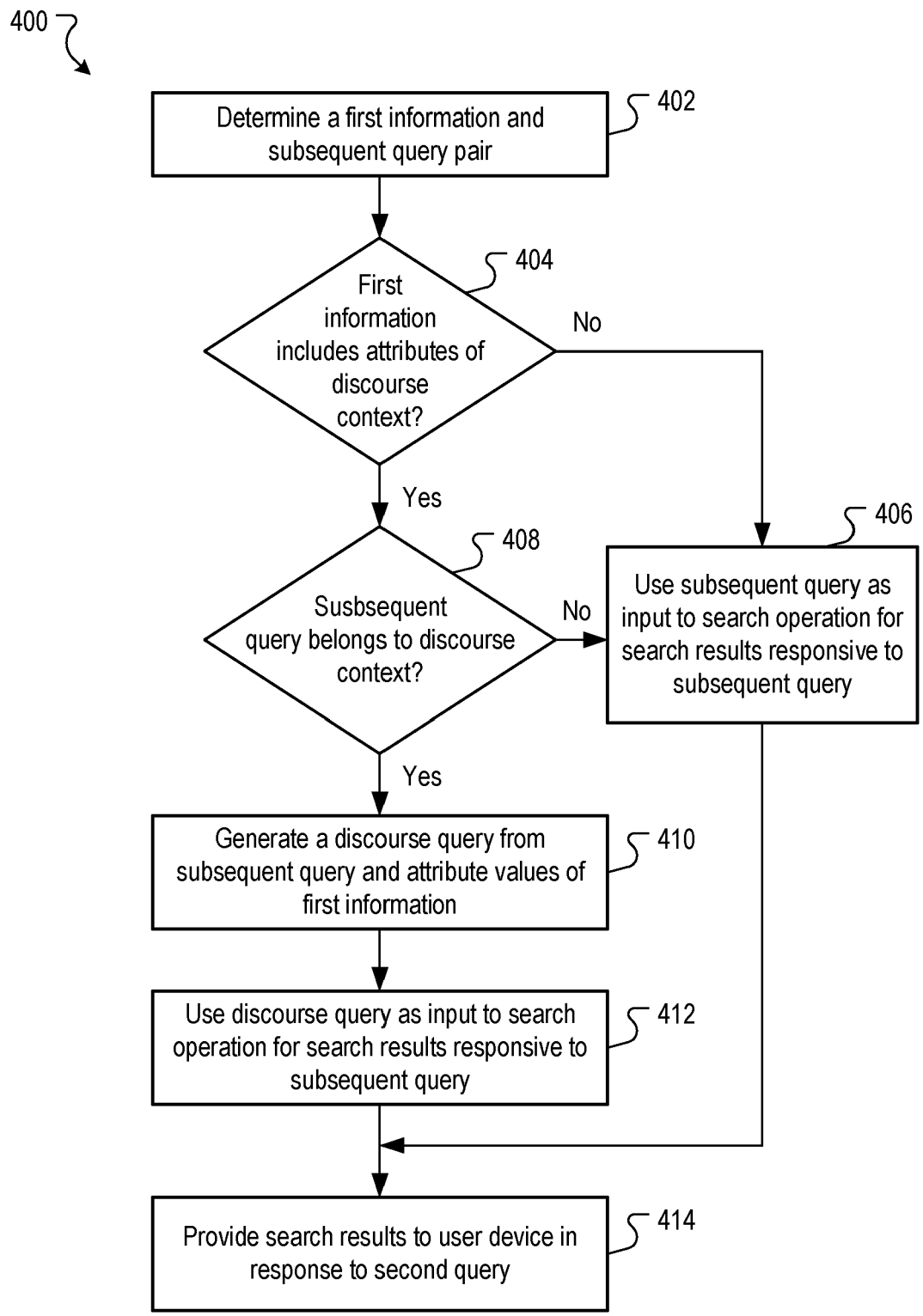
FIG. 4 is a flow chart of an example process for detecting a discourse context for a first information and subsequent query pair.

The example above is described in the context of search results. However, as described above, any information for user consumption that is provided to satisfy a user's informational need can be used as the basis of a discourse context for a second query subsequent to the providing of the first information. FIG. 4 is a flow chart of an example process 400 for detecting a discourse context for a first information and subsequent query pair. The process 400 is implemented in one or more computers that are programmed to perform the operations of the web category discourse context detector 120, and is performed for each website for which a duration performance score is to be determined.

The process 400 determines a first information and subsequent query pair (402). As described above, the first information can be a search result provided in response to a first query that forms a pair with a second, subsequent query, or can be information "pushed" to the user device and not in response to a particular query.

The process 400 determines if the first information attributes of discourse context (304). Examples of such attribute sets that are predefined as being indicative of a discourse context include one of a time attribute, a location attribute, a pair of time and location attributes, a pair of time and weather attributes, and a pair of weather and location attributes. The predefined definitions can be stored, for example, in context data 114 accessible by the discourse context detector.

If the process 400 determines the first information does not include attributes of discourse context, then the process 400 uses the subsequent query as input to search operation for search results responsive to second query (406). If, however, the process 400 determines at 404 that the first information does include attributes of discourse context, then the process 400 determines if the subsequent query belongs to the discourse context (408). A variety of appropriate processes can be used to determine the subsequent query belongs to the discourse context. For example, in some implementations, the discourse context detector 122 determines whether the subsequent query includes terms that are pre-associated with the attributes of the first information that are indicative of a discourse context. To illustrate, assume that for a discourse context of an event (e.g., an event notification), the following terms are pre-associated with the discourse context: weather, rain, umbrella, coat; likewise, for the discourse context of finance (e.g., a finance one box), the following finance-related terms are pre-associated with the discourse context: stock tickers, quote, market cap, etc.

Assume that after the notification is provided, the search system 110 then receives the query "What will the weather be like?" Because the term "weather" is pre-associated with the event one box, the query "What will the weather be like?" is determined to belong to the discourse context.

If the process 400 determines a subsequent query does not belong to a discourse context, then the process 400 uses the subsequent query as input to search operation for search results responsive to second query (406). However, if the process 400 determines the subsequent query does belong to a discourse context, then the process 400 generates a discourse query from the subsequent query and attributes values first information (410), and uses the discourse query as input to search operation for search results responsive to the subsequent query (412).

The process 400 provides search results to user device in response to subsequent query (314). If the subsequent query was used as input, then search result responsive to the subsequent query are provided. If, however, the discourse query was used as input, then search results responsive to the discourse query are provided in response to the subsequent query.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by a data processing apparatus, the method comprising:
   receiving a first query;
   in response to receiving the first query, providing first information that is responsive to the first query, for presentation;
   receiving a subsequent query, subsequent to the first information being provided for presentation in response to the first query that was provided before the subsequent query;
   determining that the first information includes an attribute value for an attribute indicative of a particular discourse context of a plurality of different discourse context types;
   in response to determining that the first information includes the attribute value for the attribute indicative of the particular discourse context, determining that the subsequent query belongs to the particular discourse context, based on the subsequent query including one or more terms that are associated with the attribute, for which the first information includes the attribute value, that is indicative of the particular discourse context; and
   in response to determining the subsequent query belongs to the particular discourse context:
      generating a discourse query that includes one or more terms of the subsequent query and that includes one or more additional terms of the first query that are determined based on the attribute value for the attribute of the first information that is indicative of the particular discourse context;
      causing a search to be performed based on the discourse query and in lieu of the subsequent query; and
      causing search results responsive to the search performed based on the discourse query to be provided, wherein causing search results responsive to the search performed based on the discourse query to be provided comprises avoiding providing the discourse query for display.

2. The method of claim 1, wherein the attribute indicative of the particular discourse context includes one of a time attribute, a location attribute, a pair of time and location attributes, a pair of time and weather attributes, and a pair of weather and location attributes.

3. The method of claim 1, wherein determining that the subsequent query belongs to the particular discourse context, based on the subsequent query including the one or more terms that are associated with the attribute, for which the first information includes the attribute value, that is indicative of the particular discourse context comprises:
   determining a semantic meaning of the subsequent query; and
   determining whether the semantic meaning is contextually related to the attribute of the first information that is indicative of the particular discourse context.

4. The method of claim 1, wherein the discourse query includes at least one term that was not included in the subsequent query.

5. The method of claim 4, wherein the at least one term is an attribute value of the first information for an attribute that is indicative of the discourse context.

6. The method of claim 1, wherein the first information comprises a search result or an answer box.

7. A system, comprising:
   a data processing apparatus comprising one or more hardware processors; and
   a non-transitory computer storage medium encoded with instructions that when executed by a data processing apparatus cause the data processing apparatus to perform operations comprising:
      receiving a first query;
      in response to receiving the first query, providing first information that is responsive to the first query, for presentation;
      receiving a subsequent query, subsequent to the first information being provided for presentation in response to the first query that was provided before the subsequent query;
      determining that the first information includes an attribute value for an attribute indicative of a particular discourse context of a plurality of different discourse context types;
      in response to determining that the first information includes the attribute value for the attribute indicative of the particular discourse context, determining that the subsequent query belongs to the particular discourse context, based on the subsequent query including one or more terms that are associated with the attribute, for which the first information includes the attribute value, that is indicative of the particular discourse context; and in response to determining the subsequent query belongs to the particular discourse context:

generating a discourse query that includes one or more terms of the subsequent query and that includes one or more additional terms of the first query that are determined based on the attribute value for the attribute of the first information that is indicative of the particular discourse context;

causing a search to be performed based on the discourse query and in lieu of the subsequent query; and causing search results responsive to the search performed based on the discourse query to be provided, wherein causing search results responsive to the search performed based on the discourse query to be provided comprises avoiding providing the discourse query for display.

8. The system of claim 7, wherein the attribute indicative of the particular discourse context includes one of a time attribute, a location attribute, a pair of time and location attributes, a pair of time and weather attributes, and a pair of weather and location attributes.

9. The system of claim 7, wherein determining that the subsequent query belongs to the particular discourse context, based on the subsequent query including the one or more terms that are associated with the attribute, for which the first information includes the attribute value, that is indicative of the particular discourse context comprises:

determining a semantic meaning of the subsequent query; and determining whether the semantic meaning is contextually related to the attribute of the first information that is indicative of the particular discourse context.

10. The system of claim 7, wherein the discourse query includes at least one term that was not included in the subsequent query.

11. The system of claim 10, wherein the at least one term is an attribute value of the first information for an attribute that is indicative of the discourse context.

12. A non-transitory computer storage medium encoded with a computer program, the program comprising instructions that when executed by a data processing apparatus cause the data processing apparatus to perform operations comprising:

receiving a first query;

in response to receiving the first query, providing first information that is responsive to the first query, for presentation;

receiving a subsequent query, subsequent to the first information being provided for presentation in response to the first query that was provided before the subsequent query;

determining that the first information includes an attribute value for an attribute indicative of a particular discourse context of a plurality of different discourse context types;

in response to determining that the first information includes the attribute value for the attribute indicative of the particular discourse context, determining that the subsequent query belongs to the particular discourse context, based on the subsequent query including one or more terms that are associated with the attribute, for which the first information includes the attribute value, that is indicative of the particular discourse context; and in response to determining the subsequent query belongs to the particular discourse context:

generating a discourse query that includes one or more terms of the subsequent query and that includes one or more additional terms of the first query that are determined based on the attribute value for the attribute of the first information that is indicative of the particular discourse context;

causing a search to be performed based on the discourse query and in lieu of the subsequent query; and causing search results responsive to the search performed based on the discourse query to be provided, wherein causing search results responsive to the search performed based on the discourse query to be provided comprises avoiding providing the discourse query for display.

13. The non-transitory computer storage medium of claim 12, wherein the attribute indicative of the particular discourse context includes one of a time attribute, a location attribute, a pair of time and location attributes, a pair of time and weather attributes, and a pair of weather and location attributes.

14. The non-transitory computer storage medium of claim 12, wherein determining that the subsequent query belongs to the particular discourse context, based on the subsequent query including the one or more terms that are associated with the attribute, for which the first information includes the attribute value, that is indicative of the particular discourse context comprises:

determining a semantic meaning of the subsequent query; and determining whether the semantic meaning is contextually related to the attribute of the first information that is indicative of the particular discourse context.

15. The non-transitory computer storage medium of claim 12, wherein the discourse query includes at least one term that was not included in the subsequent query.

16. The non-transitory computer storage medium of claim 15, wherein the at least one term is an attribute value of the first information for an attribute that is indicative of the discourse context.

* * * * *